(12) United States Patent
Baughman

(10) Patent No.: US 6,816,843 B1
(45) Date of Patent: Nov. 9, 2004

(54) METHOD AND APPARATUS FOR CONDUCTING PURCHASES IN PRIVATE OVER A NETWORK

(76) Inventor: Daniel G. Baughman, 479 N. Lower Gardens, Fontana, WI (US) 53125

( * ) Notice: Subject to any disclaimer, the term of this patent is extended or adjusted under 35 U.S.C. 154(b) by 0 days.

(21) Appl. No.: 09/545,165

(22) Filed: Apr. 6, 2000

(51) Int. Cl.[7] ............................................. G06F 17/60
(52) U.S. Cl. ............................ 705/64; 705/1; 705/50; 705/51; 705/26; 705/64
(58) Field of Search ............................. 705/1, 50, 51, 705/26, 64

(56) References Cited

U.S. PATENT DOCUMENTS

| | | | | |
|---|---|---|---|---|
| 5,715,314 A | * | 2/1998 | Payne et al. ................... | 705/78 |
| 5,793,028 A | * | 8/1998 | Wagener et al. ............ | 235/380 |
| 5,855,008 A | * | 12/1998 | Goldhaber et al. ............ | 705/14 |
| 5,960,411 A | * | 9/1999 | Hartman et al. .............. | 705/26 |
| 6,006,200 A | * | 12/1999 | Boies et al. ................... | 705/26 |
| 6,061,449 A | * | 5/2000 | Candelore et al. ............ | 380/28 |
| 6,119,101 A | * | 9/2000 | Peckover ...................... | 705/26 |
| 6,260,024 B1 | * | 7/2001 | Shkedy ......................... | 705/37 |
| 6,343,738 B1 | * | 2/2002 | Ogilive ......................... | 235/381 |

FOREIGN PATENT DOCUMENTS

JP          10326310 A    * 12/1998      ........... G06F/17/60

OTHER PUBLICATIONS

Mosley–Matchett, JD, "Big bucks or lots of tiny bucks", Marketing News, v31n16, Aug. 4, 1997.*

* cited by examiner

*Primary Examiner*—James P. Trammell
*Assistant Examiner*—Calvin L Hewitt, II
(74) *Attorney, Agent, or Firm*—Foley & Lardner LLP

(57) ABSTRACT

A privacy apparatus and method for purchasing goods or acquiring services over an unsecured network, such as the Internet. By the use of a middle-man company, or proxy, a purchaser sends his/her personal information needed to make the purchase to the middle-man company. The middle-man company deals directly with the seller, and does not provide any information regarding the purchaser to the seller. The seller ships the purchase to the middle-man company, using information on the middle-man company supplied to it from the middle-man company. Upon receipt of the goods or services sent from the seller, the middle-man company provides them to the purchaser, thereby providing privacy for the purchaser with respect to the seller.

1 Claim, 4 Drawing Sheets

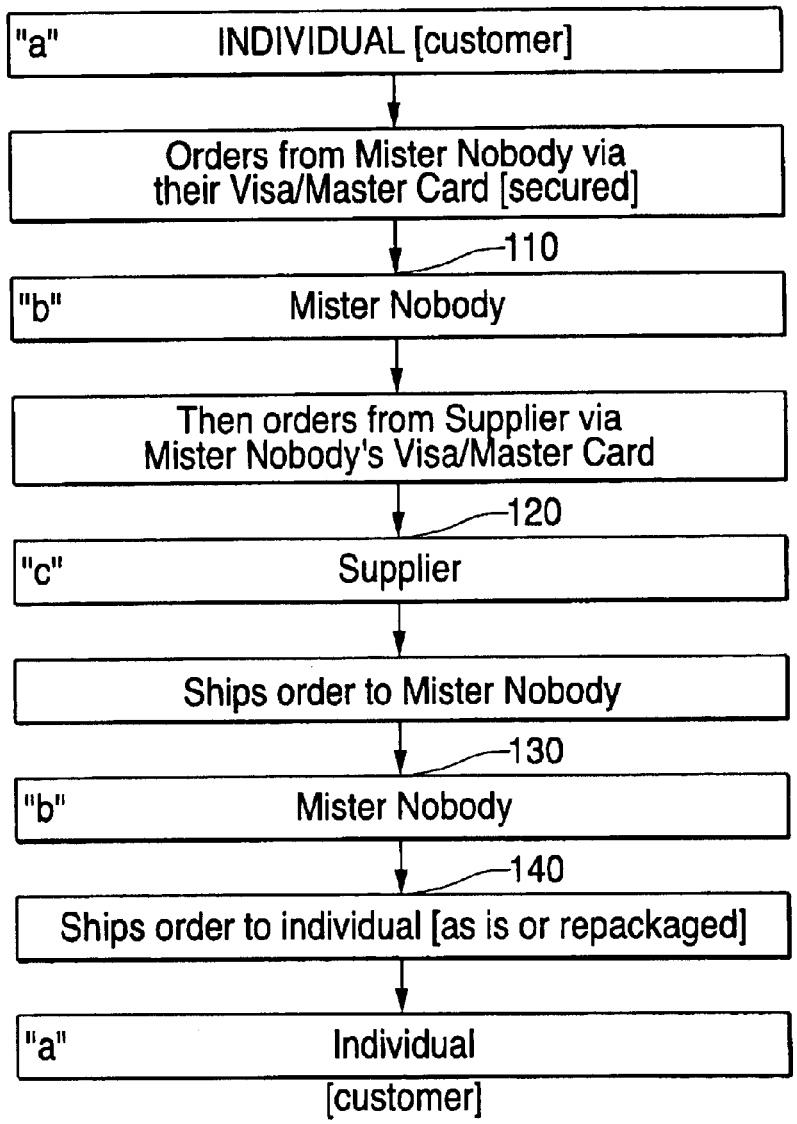

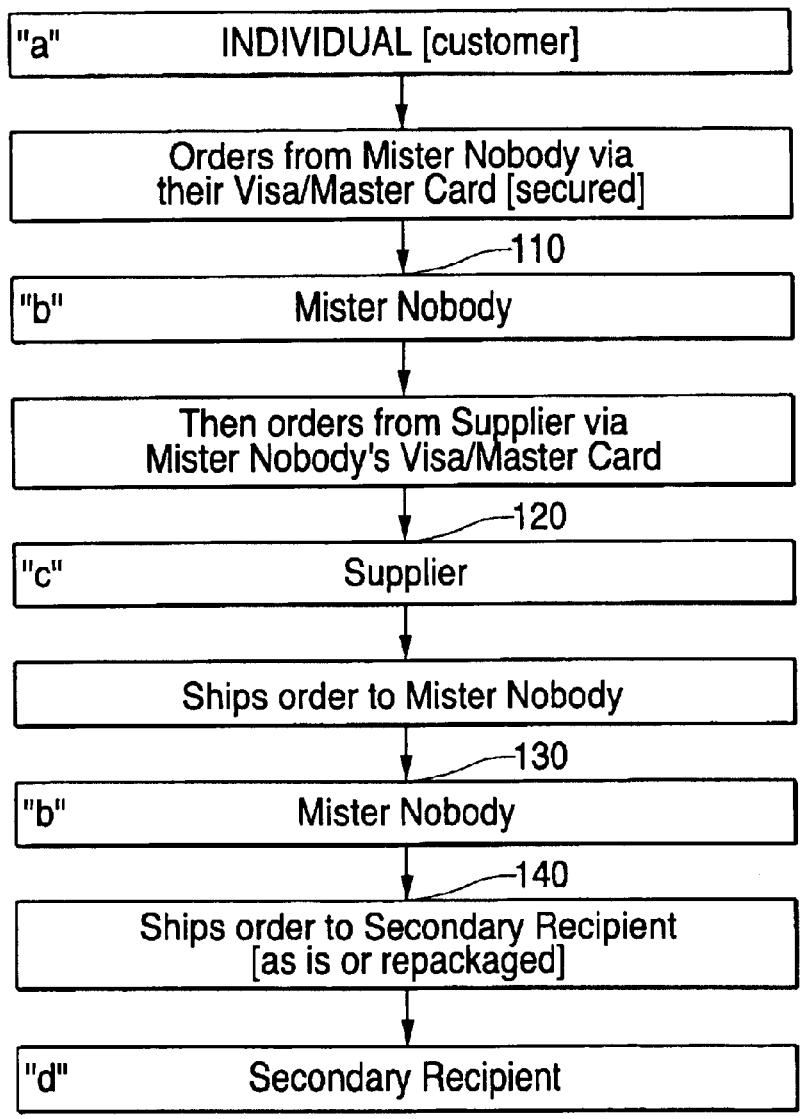

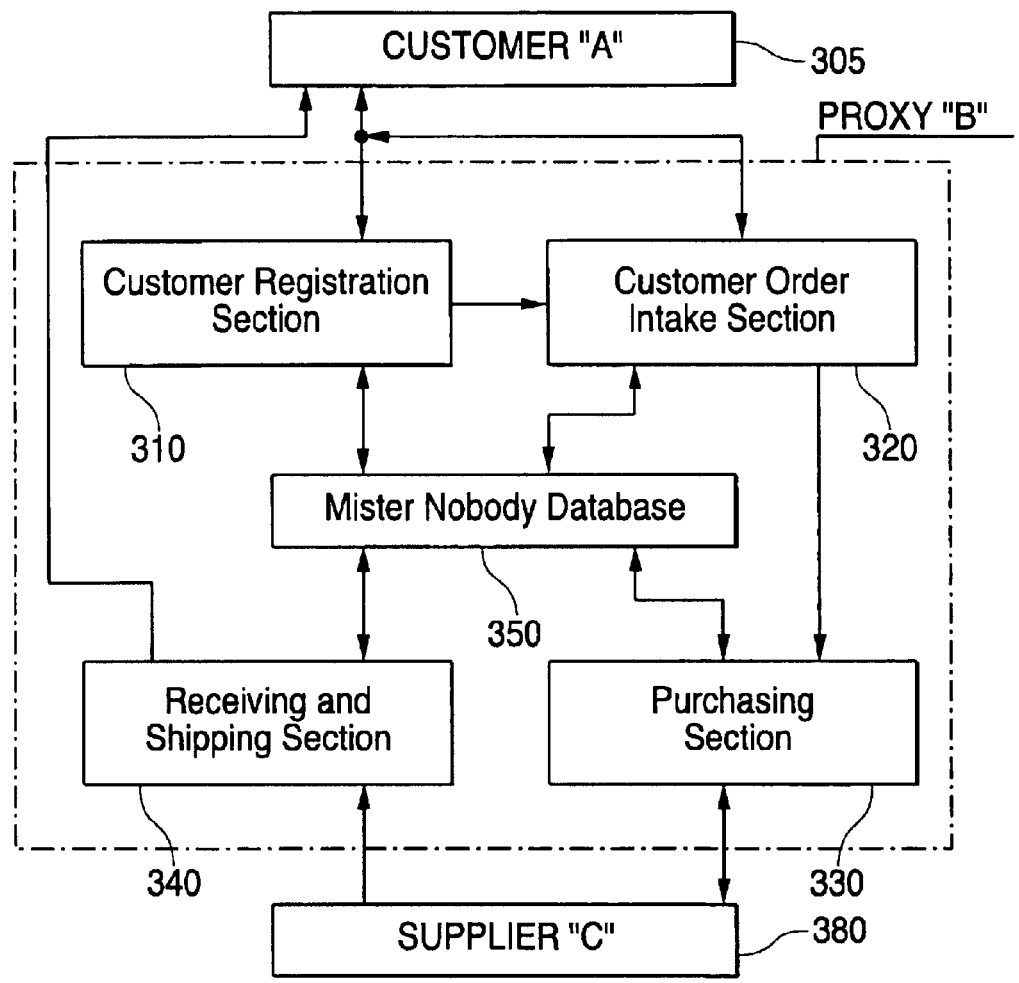

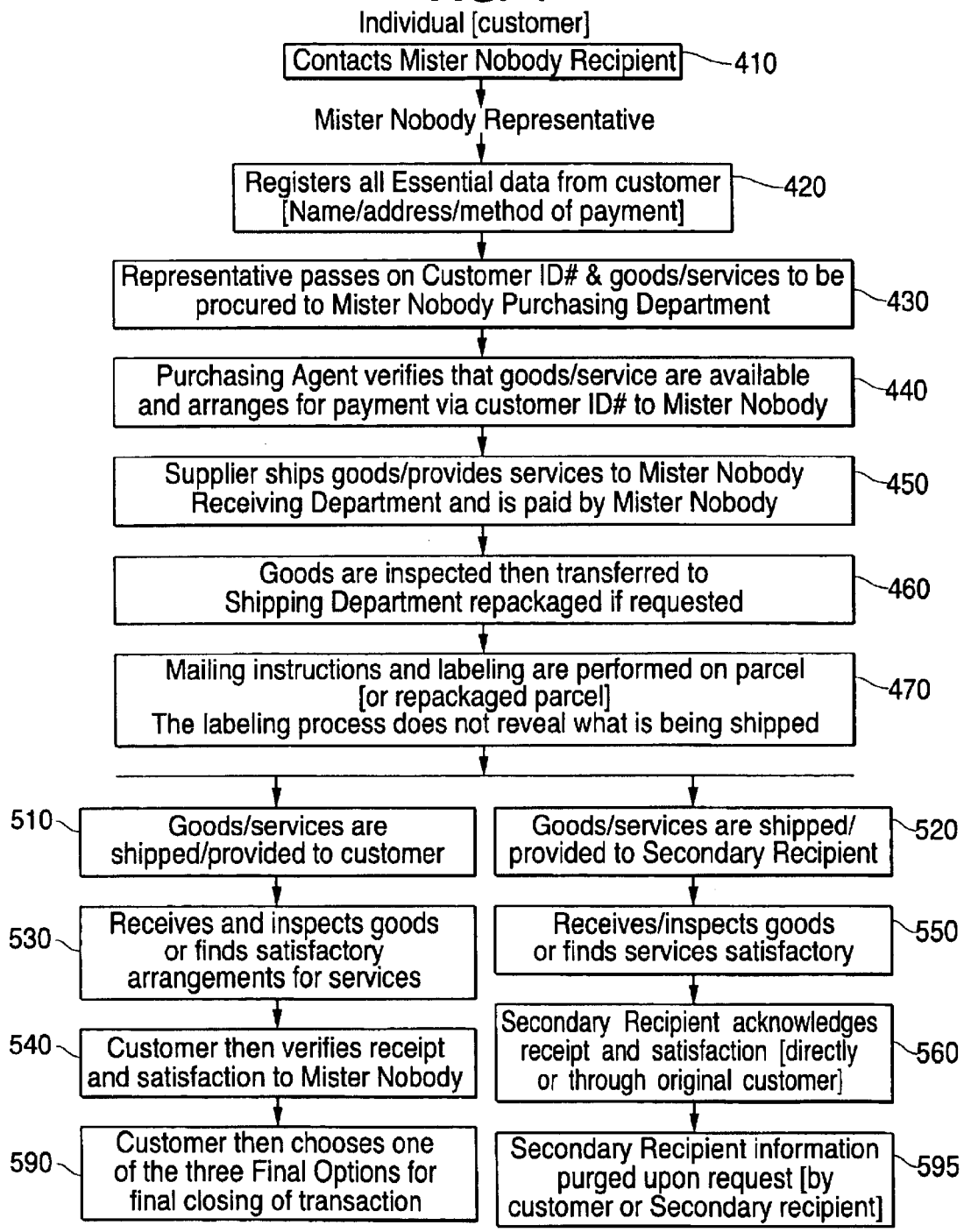

METHOD AND APPARATUS FOR CONDUCTING PURCHASES IN PRIVATE OVER A NETWORK

BACKGROUND OF THE INVENTION

1. Field of the Invention

The present invention relates to an apparatus and a method for conducting purchases in private over a network, such as the Internet.

2. Description of the Related Art

In this day and age, companies want to know everything they possibly can about their customers and customer base. Customer purchasing data is sought, bought, analyzed, and sold extensively by the vast majority of companies. Because of these practices, it is no wonder that, in survey after survey, customers list privacy as their number one concern today.

For that matter, privacy and security are major concerns of customers who desire to purchase products over a network, such as the Internet. For example, a poll conducted by PC Magazine indicated that "privacy and security" were the top concerns of online shoppers, beating out "can't inspect product", "unfamiliar with process", "don't want to wait for delivery", and "no concerns". PC Magazine, Aug. 10, 1999, obtained from www.zdnet.com/pcmag/stories/reviews. A survey by IBM also indicates that privacy is the key to e-commerce. See "IBM Survey Says Privacy Key to E-Commerce", by M. Songini, Network World Fusion, Nov. 10, 1999. In that article, it states that 40 percent of Web users polled say they decided not to buy something because of privacy fears, and that, of American consumers, 78% refused to give information online, 54% left the site without buying, and 64% believe most businesses handle confidential data carefully. Given recent incidents concerning hacking of major web sites, privacy and security concerns will only become more of an issue in the future.

Current e-commerce companies stress that they are secure in that any confidential information sent over the Internet, such as credit card information, is encrypted and cannot be stolen by Internet bandits. However, while this may or may not be true, there is still the worry that the company itself will either utilize the customer's private information to their own benefit, or sell it to others in order to make more money. Therefore, the customer needs to be protected.

SUMMARY OF THE INVENTION

The invention provides a method and apparatus for providing a private network transaction so as to make a buyer's personal information inaccessible to a seller.

The private network transaction may be accomplished by a method of providing a private purchase transaction over a network. The method includes providing, by a purchaser to a company different from a seller, information required to purchase a product or obtain a service from the seller. The method also includes ordering, by the company to the seller, is the product or the service by using information regarding the company and not the information obtained from the purchaser in the previous step. The method further includes supplying, from the seller to the company, the product or the service ordered based on the information provided by the company in the previous step. The method also includes supplying, from the company to the purchaser, the product or the service ordered, the supplying being made based on the information provided in first step.

The private network transaction may be accomplished by a method of providing a private purchase transaction over a network. The method includes providing, by a purchaser to a company different from a seller, information regarding a desired recipient, the information being required to provide a product from the seller to be eventually sent to the desired recipient. The method also includes ordering, by the company to the seller, the product or the service by using information regarding the company and not the information obtained from the purchaser in the previous step. The method further includes supplying, from the seller to the company, the product or the service ordered based on the information provided by the company in the previous step. The method also includes supplying, from the company to is the desired recipient, the product or the service ordered, the supplying being made based on the information provided in the first step.

The private network transaction may be accomplished by a system for providing private purchases over a network, where the system includes a proxy unit that provides an interface between a buyer and a seller. The proxy unit includes a customer registration section that obtains personal information of the buyer and that provides the buyer with a password, identification number or tag. The proxy unit also includes a customer order section that obtains information related to a purchase to be made for the customer, the information being provided by the customer by using the password. The proxy unit further includes a database that stores the personal information of the buyer, the information related to the purchase, and stores that information with the password as a tag to obtain that information. The proxy unit still further includes a purchasing section that, upon indication from the customer order section that the information related to the purchase is available from the database, contacts the seller in order to make the purchase using personal information of the proxy unit and not of the buyer, wherein a purchase identification tag, identification number or password is also stored in the database together with the personal information of the buyer. The proxy unit also includes a receiving section that receives goods or services related to the purchase, sent by the seller, and that obtains the personal information of the buyer from the database using the purchase identification tag or password that is provided by the seller with the goods or services, in order to ship the goods or services to the buyer.

BRIEF DESCRIPTION OF THE DRAWINGS

The invention will become more fully apparent from the following detailed description when read in conjunction with the accompanying drawings with like reference numerals indicating corresponding parts throughout, and wherein:

FIG. 1 shows a flow diagram of a typical transaction according to a first embodiment of the invention;

FIG. 2 shows a flow diagram of a typical transaction according to a second embodiment of the invention;

FIG. 3 shows in block diagram form one configuration of the proxy or middleman that can be used with either the first or second embodiments of the invention; and FIG. 4 shows a flow diagram showing details of a typical transaction according to either the first or second embodiments of the invention.

DETAILED DESCRIPTION OF THE PREFERRED EMBODIMENTS

Preferred embodiments of the present invention will be described in detail hereinbelow, with reference to the drawings.

As discussed previously, privacy and security are major concerns of customers who either purchase or desire to purchase products and/or services over a network. The network may either be an unsecure network such as the Internet, or it may be a secure network. In the method and apparatus according to the invention, a middle-man, or proxy, is used. This middle-man is called "Mister Nobody" in the preferred embodiments, and corresponds to an entity that does not care at all about its customers' personal information. That sounds strange indeed, but it means a great deal, especially to the customers. The middle-man provides its customers absolute anonymity in their process of purchasing goods or services. To accomplish this goal to the fullest extent possible, the middle-man fundamentally has no desire to know its customers or their purchasing habits. In fact, to gather and analyze any information about the customer would violate the very nature of this unique and special company.

Mister Nobody does not care whether the purchaser is 18 or 80, white or black, Asian or Indian, Christian or Buddhist, man or woman. Mister Nobody has no need to know its customers because its fundamental purpose is to never disclose any information or data about its customers to the outside world. Furthermore, it has no use for such acquired data internally beyond the immediate purchasing process. Mister Nobody already knows at the outset all that it will ever need to know about its customers, with that information being obtained from the customers themselves. What Mister Nobody knows is that: a) its customers are disturbed by the lack of privacy provided by companies in general, b) its customers would like complete privacy and anonymity, c) its customers desire prompt fulfillment of the purchase, and d) its customers desire courteous service.

Referring now to FIG. 1, a typical transaction according to a first embodiment of the invention begins with the prospective customer/purchaser "a" making contact with Mister Nobody "b", as shown by line 110. The customer provides his/her credit card information to Mister Nobody, preferably in a secure manner. The customer is then guided on his/her quest. If the customer does not already know where to buy what he/she is looking for, Mister Nobody could help make suggestions. For example, Mister Nobody could suggest that all Internet window shopping/browsing be done through one of the sources currently available for this task that provides anonymous web browsing. Anonymity.com is one of several Internet companies providing such a service at present. After the customer knows the product or service that is desired, for example, after performing some web browsing, the purchasing process with Mister Nobody begins.

In a first embodiment, once the customer provides all essential information needed to accomplish the transaction, the customer informs a Mister Nobody representative, at a customer intake section of Mister Nobody, where to procure the goods/services desired. The customer then hands the entire purchasing process over to Mister Nobody. In the first embodiment, the customer interacts with the Mister Nobody representative at the customer intake section of Mister Nobody via a standard telephone call, where the customer verbally provides the information to that Mister Nobody representative. Such information would typically include customer name, customer address, and customer credit card information. Alternatively, the customer can provide such information to Mister Nobody over the Internet via a secure (e.g., encrypted) connection.

In the first embodiment, another Mister Nobody representative then verifies availability of the goods/services desired by the customer, and yet another Mister Nobody representative proceeds to make the order with the supplier "c" after payment arrangements have been made with the supplier. As shown in line 120, Mister Nobody uses its own credit card, and not the credit card of the customer who is going to actually receive the goods/services, when it makes its order with the supplier "c". Thus, the supplier of the goods/services sees only Mister Nobody as the customer, and ships the goods/services to Mister Nobody "b", as shown in line 130. By the method according to the first embodiment, there is never a direct link between the supplier "c" and the original purchaser "a". Once Mister Nobody "b" receives the goods/services from the supplier "c", it ships the goods directly to the customer "a" who desires those goods/services. This is shown as line 140 in FIG. 1. In certain circumstances, where services are provided to the customer, after Mister Nobody makes a payment, there may be a direct (but anonymous) link between seller and customer. If online, services may be obtained via a private search engine (i.e., anonymizer.com). If offline, services may be obtained directly from the seller without revealing the customer's identity.

In a second embodiment, which is shown in a flow diagram in FIG. 2, the customer "a" indicates that Mister Nobody "b" purchase the goods/services and then distribute them to a specified outside party or recipient "d", whose identify and anonymity would be protected from the supplier "c" in the same manner as the primary customer. In this second embodiment, both the customer "a" and the recipient "d" are completely concealed from the supplier "c". This alternative could be quite appealing, relative to today's norm. For example, it is not uncommon these days to receive a Christmas gift from someone via a mail-order catalog or an on-line provider, whereby that on-line provider then adds the recipient to their database. This may be undesirable to the recipient, who may then receive "junk mail" (e.g., unwanted catalogs) from the on-line provider, and the present invention prevents this from happening.

In the first and second embodiments of the invention, Mister Nobody, the middle-man company or entity, is designed to make every effort internally to ensure concealed identities, such as by using customer number versus customer name for maximum security. This can be done throughout the ordering process unless absolutely necessary (e.g., final shipping). In one possible construction for Mister Nobody, as shown in FIG. 3 and as described with reference to the flow diagram of FIG. 4, a customer first makes contact with a Mister Nobody representative, shown by line 410 in FIG. 4. When the customer is registered with a Mister Nobody representative at a customer registration section 310 of Mister Nobody (see FIG. 3), the customer would be provided with a customer number and a password/pin/or fictitious user name. The essential information provided by the customer in order to make a purchase, such as "name", "address", "method of payment", etc., would preferably be stored in a database 350 at Mister Nobody, which is preferably a secure database and which stores all essential data provided by the customer. This is shown as step 420 in FIG. 4.

Once the customer has been registered, if the customer desires to purchase goods and/or services, the customer is directed to a Mister Nobody representative at a Customer Order Section 320 of Mister Nobody (see FIG. 3). The customer provides his/her order information using his/her customer number.

The customer order information is then provided to Purchasing Section 330 of Mister Nobody, which would, upon verification of customer identity via the customer's password/pin or fictitious name, verify the method of payment, address to ship to, etc. This is shown as steps 430 and 440 in FIG. 4. Actual cash or credit card processing, where a real name may have to be revealed, would be handled and monitored preferably by highly bonded and qualified individuals employed by Mister Nobody who are sworn to absolute secrecy. Similar to the handling of Secret national security information by the government, separate and distinct portions of the customer's personal information would be made known only to different representatives in different sections of Mister Nobody, so as to compartmentalize the information such that no one person at Mister Nobody knows the entire personal information of the customer. For example, card numbers could be split into halves, thirds or other segments as to compartmentalize information. The database 350 at Mister Nobody preferably provides security codes and security levels in a manner known to those skilled in the art to provide such a compartmentalized system.

Once the verification is made as to a customer's order, the purchasing section 330 at Mister Nobody completes the transaction with the supplier of goods/services. A Mister Nobody representative at the purchasing section 330 of Mister Nobody only knows a customer by the customer number and not by the customer's real name. Customer name does not follow through the different sections of Mister Nobody for added security. That is, once the customer is provided with his/her customer number and his/her password/pin or fictitious name by the customer registration section 310, all other sections refer to the customer by the customer number.

When goods are shipped from the seller to Mister Nobody or when services are made available, as shown by step 450 in FIG. 4, the transaction would proceed to the receiving and shipping section 340 of Mister Nobody. It is here, and only here, that a customer name may be required for labeling purposes. Even here, such a use of a real name may not necessarily be required, i.e., initials could suffice for customer delivery identity, since a correct address may be all that is needed in many situations in order to send a package to a customer via mail. At the receiving and shipping section 340, goods are inspected and then repackaged, if requested by the customer. This is shown as step 460 in FIG. 4. In step 470, mailing instructions and labeling are performed on the parcel (or repackaged parcel), by the receiving and shipping section 340. The labeling process does not reveal what is being shipped.

In the first and second embodiments, Mister Nobody would charge a membership fee, then a fixed amount per order plus subsequent shipping charges would be charged to the customer. The apparatus and method according to the invention tacks on an extra shipping charge to be paid by the customer, since there is a first shipping cost from the supplier to Mister Nobody, and then a second shipping cost from Mister Nobody to the customer. Mister Nobody may also add a service charge to each goods/service transaction. In one configuration, Mister Nobody would have a plurality of sites spread out over a region, such as the continental United States. Based on the location of the supplier and the location of the customer, Mister Nobody would determine an appropriate location, preferably between the supplier and the customer, for the supplier to ship the goods to. That would help lower the costs associated with the double-shipping involved.

Once the goods have been shipped or the services have been made available to the customer or recipient, as shown by steps 510 and 520 (step 510 and all steps below that step are for the first embodiment and step 520 and all steps below that step are for the second embodiment), no further obligation or involvement is required by the customer, except final notification to Mister Nobody that the goods/services were received/provided, and that the customer is completely satisfied and that Mister Nobody has provided the goods/services as promised. This is shown as steps 530 and 540 for the first embodiment, and steps 550 and 560 for the second embodiment.

If there is a problem with the goods/services, they would be returned back to the receiving/shipping section of Mister Nobody from the customer, and Mister Nobody would return them to the supplier, in a reverse process with respect to how the goods/services were supplied to the customer. When Mister Nobody is credited by the seller for the returned goods, then Mister Nobody will in turn credit the customer.

It is at the time the customer receives the goods/services and if he/she is satisfied with them, that the customer releases Mister Nobody from any and all responsibility for the goods/services unless further arrangements have been made with Mister Nobody (for an additional fee, preferably) regarding warrantees, breakage, etc. Since most warrantees are made between the manufacturer and the end consumer, utilization of those warrantees would generally be the responsibility of the end consumer. It is also at this time that the customer would close the transaction by contacting Mister Nobody. For example, in the first and second embodiments, the customer would be presented with three options. This is shown as step 590 in FIG. 4. Option 1 corresponds to "no further contact", whereby all data on the customer held at Mister Nobody would be purged based on the customer selecting this option. With Option 1, the customer in effect disappears, with respect to Mister Nobody. This is akin to buying with cash from a store where you are not known and will never be seen again. Option 2 corresponds to Mister Nobody being directed by the customer to purge records of transactions only, but to keep customer vital information (e.g., address, name, credit card number) on file for ease of future purchasing. Option 3 corresponds to Mister Nobody being directed by the customer to keep records of any or all past purchases (preferably accessible for convenience by the customer) for the customer's review, as well as to keep the customer vital information for ease of future ordering. In the second embodiment, the information of the recipient, which is separate from the customer who made the order with Mister Nobody, can be purged upon request by either the customer or by the recipient. This is shown as step 595 in FIG. 4.

One foreseeable delay in finalizing the transaction would be the mandated time period to close a credit card transaction, to protect against credit card fraud (charge backs). This may take as long as three months before final purge, and would not normally cause a problem.

In the first and second embodiments, Mister Nobody would not solicit the customer for any reason, even if the customer opts to have their information kept on file at Mister Nobody. Internally, the customer's information stored at Mister Nobody is treated as closed until or unless the customer chooses to order again. Also, in the first and second embodiments, under no circumstances will a customer's personal information or transaction data ever be supplied to an outside entity. The sole exception would be by court order, in the event of suspected unlawful use. Mister Nobody would not order or be involved in any way with illegal or illicit merchandise services, and at the customer ordering stage information would be obtained from the customer in order to ensure that this is the case.

Mister Nobody would preferably set a rule that all of its customers must be 18 years of age or older. No liquor, explosives, firearms, ammunition, or other illicit/unlawful items would be ordered by Mister Nobody.

Also, in the first and second embodiments, Mister Nobody would reserve the right to purchase only from reputable vendors and would cooperate fully with law enforcement officials if any customer should ever attempt to procure dangerous/illegal/illicit materials.

FIG. 3 shows the information exchange paths between the separate sections of Mister Nobody. As explained earlier, a customer 305 initially contact a customer registration section 310 of Mister Nobody (or proxy "b" as labeled in FIG. 3), whereby the customer 305 is provided with his/her customer number or his/her password/pin or fictitious name. The customer is then directed by the customer registration section 310 to the customer order section 320, so that the customer can make an order and/or be provided with help in making an order (e.g., information on various web sites that the customer may want to visit prior to making his/her order). The customer order section 320 enters information into the Mister Nobody Database 350, where that information corresponds to purchase information and where that purchase information is tagged by the customer number.

The customer order section 320 then alerts the purchasing section 330 to make a purchase for the customer. The purchasing section 330 refers to the purchase information stored in the database 350, and uses the Mister Nobody credit card to make the purchase from the supplier 380. Thus, no personal information of the customer is needed. However, Mister Nobody needs to keep track of which order is which, so an order number or some other kind of tracking number is provided to the supplier 380, so that Mister Nobody can determine where to ship the order.

When the supplier 380 ships the goods/services, they are shipped to Mister Nobody, where they are received at the receiving/shipping section 340 of Mister Nobody. The receiving/shipping section 340 refers to the order number on the goods, and refers to the database 360 in order to obtain the necessary customer information so as to ship the goods to the customer. As discussed above, even the receiving/shipping section 340 need not know the entire customer information, since a valid address may be all that is necessary in many instances to ship goods to the customer. However, in most cases the correct customer name, or perhaps just initials for simple identification, is provided on the shipping label.

In a third embodiment, the present invention is applied off-line or off-network, such as to a telephone mail order purchase, whereby the purchaser first contacts Mister Nobody via telephone (or via a communications network) with the purchase order information, and where Mister Nobody then makes the order from the seller by calling the seller via the telephone. That way, the seller is not provided with any information concerning the purchaser, but rather is provided with information on Mister Nobody.

While preferred embodiments have been described herein, modification of the described embodiments may become apparent to those of ordinary skill in the art, following the teachings of the invention, without departing from the spirit and scope of the invention as set forth in the appended claims. It is clear from the above description that increased privacy to a customer is available, but at a price in which added costs are involved (such as the need to ship from the seller to Mister Nobody, and then from Mister Nobody to the purchaser). However, that added cost is well worth it to people who want to keep their personal information private.

What is claimed is:

1. A system for conducting a purchase transaction between a buyer and a seller over a network, comprising:

a third party proxy unit for performing a purchase transaction between the a buyer, a third party and a seller without providing any personal information regarding the buyer to the seller, said proxy unit including:

a memory;

a customer registration section configured to receive, from the buyer, identification information required to purchase a product or obtain a service from the seller over the network, the customer registration section configured to store the identification information of the buyer in the memory;

a customer order intake section configured to receive, from the buyer, product information or service information regarding a product or a service desired to be purchased from the seller over the network by way of the proxy unit, the customer order intake section configured to store the product information or the service information in the memory;

a purchasing section configured to purchase the product or to obtain the service by using identification information of the proxy unit and not the identification information of the buyer that was obtained by way of the customer registration section;

a receiving and shipping section configured to receive the product or obtain the service ordered by the purchasing section and that has been sent to the proxy unit from the seller, the receiving and shipping section configured to store, in the memory, product/service information related to the product or the service that has been received by the receiving and shipping section and that is to be supplied to the buyer;

the receiving and shipping section configured to ship the product or the service to the buyer based on the identification information of the buyer that is stored in the memory;

the proxy unit configured to provide the buyer with options to either: i) purge the identification information of the buyer and the product information or the service information of the product or the service received by the buyer from the memory, ii) purge only the product information or the service information of the product or the service received by the buyer from the memory and leave the identification information of the buyer intact in the memory; or iii) do not purge any of the identification information of the buyer or the product information or the service information of the product or the service received by the buyer from the memory;

the proxy unit configured to receive option selection information from the buyer regarding which of the options provided to the buyer has been selected by the buyer; and the proxy unit configured to update the memory based on the option selection information received from the buyer.

* * * * *